United States Patent
Defilippi et al.

(10) Patent No.: US 8,101,255 B2
(45) Date of Patent: Jan. 24, 2012

(54) MULTI-LAYER TUBE FOR CONDUCTING FUEL IN A MOTOR VEHICLE

(75) Inventors: Roberto Defilippi, Turin (IT); Mario Zasa, Nichelino (IT)

(73) Assignee: Dytech-Dynamic Fluid Technologies S.p.A., Turin (IT)

( * ) Notice: Subject to any disclaimer, the term of this patent is extended or adjusted under 35 U.S.C. 154(b) by 66 days.

(21) Appl. No.: 12/442,929

(22) PCT Filed: Sep. 26, 2006

(86) PCT No.: PCT/IT2006/000684
§ 371 (c)(1),
(2), (4) Date: Aug. 26, 2009

(87) PCT Pub. No.: WO2008/038310
PCT Pub. Date: Apr. 3, 2008

(65) Prior Publication Data
US 2010/0009107 A1    Jan. 14, 2010

(51) Int. Cl.
*B32B 1/08* (2006.01)
*B32B 27/08* (2006.01)
*B32B 27/20* (2006.01)
*B32B 27/32* (2006.01)
*B32B 27/34* (2006.01)
*F16L 9/14* (2006.01)
*F16L 11/04* (2006.01)

(52) U.S. Cl. .......... 428/36.91; 428/34.7; 428/35.7; 428/36.4; 428/36.7; 138/141

(58) Field of Classification Search .......... 428/34.1, 428/34.4, 34.6, 34.7, 35.7, 35.8, 35.9, 36.1, 428/36.2, 36.4, 36.5, 36.7, 36.8, 36.9, 36.91; 138/140, 141, 145, 146, 153
See application file for complete search history.

(56) References Cited

U.S. PATENT DOCUMENTS

| | | | |
|---|---|---|---|
| 6,989,198 | B2 | 1/2006 | Masuda et al. |
| 2002/0056482 | A1* | 5/2002 | Katayama et al. ............ 138/138 |
| 2004/0135371 | A1* | 7/2004 | Masuda et al. ............... 285/423 |

FOREIGN PATENT DOCUMENTS

| | | |
|---|---|---|
| DE | 4132123 | 4/1992 |
| EP | 0445706 | 9/1991 |
| EP | 1645412 A | 4/2006 |

OTHER PUBLICATIONS

International Search Report prepared by the European Patent Office on Jul. 12, 2007, for International Application No. PCT/IT2006/000684.

Written Opinion prepared by the European Patent Office on Jul. 12, 2007, for International Application No. PCT/IT2006/000684.

* cited by examiner

*Primary Examiner* — Walter B Aughenbaugh
(74) *Attorney, Agent, or Firm* — Sheridan Ross P.C.

(57) ABSTRACT

A motor vehicle fuel conveying multi-layer co-extruded tube (1) comprising at least an innermost first layer (2) of a polyamide resin (P9T) consisting of a dicarboxylic acid component and a diamine component, wherein 60÷100% of the dicarboxylic acid component is terephthalic acid and 60÷100% of the diamine component is selected from 1,9-nonanediamine and 2-methyl-1,8-octanediamine; an intermediate second layer (3) of polyamide 6 (PA 6); an intermediate co-polyamide (CoPA)-based tie layer (4); and an external fourth layer of polyamide 12 (PA12).

14 Claims, 1 Drawing Sheet

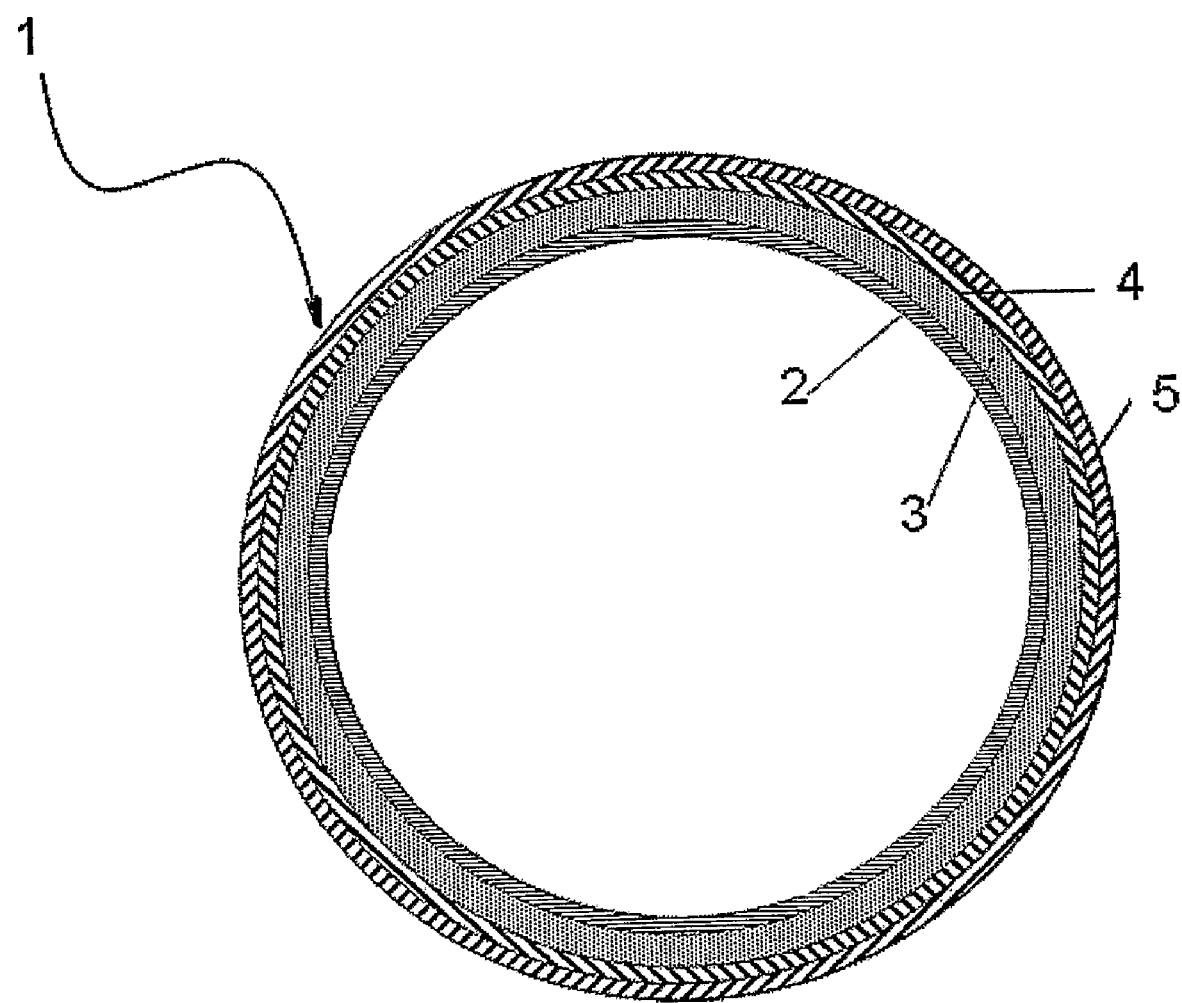

MULTI-LAYER TUBE FOR CONDUCTING FUEL IN A MOTOR VEHICLE

CROSS REFERENCE TO RELATED APPLICATIONS

This application is a national stage application under 35 U.S.C. 371 of PCT Application No. PCT/IT2006/000684 having an international filing date of 26 Sep. 2006, which designated the United States, the entire disclosure of which is hereby incorporated herein by reference.

TECHNICAL FIELD

The present invention relates to a tube of polymeric material for conveying fuels under high pressure from a pump to an engine of a motor vehicle. In particular, the present inventions relates to a multi-layer structure having excellent properties of resistance to permeation, intra-layer adhesion, heat and chemical resistance and impact resistance also at low temperature.

STATE OF THE ART

As it is known, tubes of thermoplastic or elastomeric material, preferably made of a number of materials with different chemical composition, are used for conveying fuels in motor vehicles. For safety reasons, a multi-layer tube for gasoline and/or diesel fuel has to be impermeable to vapours of gasoline and/or diesel fuel and resistant to both high and low temperatures, as well as flame-resistant. Further, the environmental provisions recently come into force impose progressively stricter limits, in particular as concerns the emissions of volatile hydrocarbons or the like from the fuel tank and the fuel line ducts.

Also, catching on is the use of alcohol gasoline, that is of gasoline to which, with a view to reducing consumptions and obtaining an improvement of performances, an alcohol having a low boiling point is added, such as methanol and ethanol, or an ether such as methyl-terbuthyl ether (MTBE). In the presence of such compounds, however, conventional polyamide-base resins such as nylon 6 or nylon 11, which ensure nevertheless good properties of mechanical resistance and flexibility, do not fully meet permeability requirements. Increasing the layer thickness would be necessary, which would result in a reduction of flexibility and in an undesirable increase of weight and costs. Further, in the presence of alcohol fuels, the greater permeability is associated with a worsening of mechanical properties, in particular in terms of elongation at tear and cold impact resistance.

Further, over the past few years, maximum pressure and temperature values, in both gasoline direct injection (GDI) and diesel engines, have been rising. In the light of that, it is preferable that the materials used for the manufacture of tubes for conducting fuels be extremely resistant to high temperatures, so as to guarantee satisfactory performances.

It is known from U.S. Pat. No. 6,989,198 to use a multi-layer structure comprising at least a layer comprising nylon 11 and/or nylon 12 and a layer comprising a polyamide resin (nylon 9T) consisting of a dicarboxylic acid component and a diamine component, with 60÷100% mol of the dicarboxylic acid component being a terephthalic acid and 60÷100% mol of the diamine component being selected from 1,9-nonanediamine and 2-metil-1,8-octanediamine.

Such a multi-layer structure shows very good properties of resistance to permeation, in particular against noxious hydrocarbons contained in alcohol gasoline. At the same time, such a multi-layer structure ensures properties of thermal and chemical resistance.

However, the multi-layer structure disclosed by U.S. Pat. No. 6,989,198 shows elongation at tear values which are limited in the extrusion direction, and which are even more limited and not satisfactory in the cross-wise direction. Further, the structure disclosed by U.S. Pat. No. 6,989,198 shows a poor workability by elastic deformation of the ends of a tube section.

The above mentioned limitations prove particularly critical during the stages of assembling, fitting insertion, etc. because under those conditions it is easy to cause the yield, or even the cracking of the materials.

OBJECT OF THE INVENTION

It is an object of the present invention to provide a tube in plastic material which is suitable for solving the above mentioned drawbacks and which can at the same time ensure low permeability and high resistance to both low and high temperatures.

According to the present invention, there is provided a multi-layer tube for conducting fuel (gasoline and/or diesel fuel) in motor vehicles, characterized in that it comprises at least:

a layer comprising a nylon 9T polyamide resin (P9T) consisting of a dicarboxylic acid component and a diamine component, wherein 60÷100% of the dicarboxylic component is terephthalic acid and 60÷100% of the diamine component is a diamine component selected from 1,9-nonanediamine and 2-methyl-1,8-octanediamine;

a layer of polyamide 6 (PA6);

a tie layer; and a layer of polyamide 12 (PA12).

In particular, according to a preferred embodiment of the present invention, there is provided a tube consisting of an innermost layer of nylon 9T, an intermediate layer of PA6, a tie layer of a co-polyamide (CoPA), and an external layer of PA12.

BRIEF DESCRIPTION OF THE DRAWING

For a better understanding of the present invention, it is now further described with reference to the attached FIG. 1, which illustrates a transverse cross-sectional view of a multi-layer tube of Example 1 according to the present invention.

BEST MODE FOR CARRYING OUT THE INVENTION

The manufacture of tube 1 in polymeric material is carried out according to a well known process, whereas the combination of materials selected, and the consequent properties thereof are innovative.

In particular, a tube 1 according to the present invention comprises at least:

a first innermost layer 2 of P9T, having preferably a thickness in the range 0.10 mm÷0.25 mm;

a second intermediate layer 3 of PA6, having preferably a thickness in the range 0.20 mm÷0.30 mm;

a third intermediate tie layer 4 of a CoPA, having preferably a thickness in the range 0.10 mm÷0.30 mm; e a fourth external layer 5 of PA12, having preferably a thickness in the range 0.35÷0.55 mm.

Preferably, the first innermost layer 2 consists of P9T.

For the innermost first layer 2 a nylon 9T polyamide resin is preferably employed, which is particularly suitable for manufacturing a layer with a permeation barrier function, e.g. P9T GENESTAR by KURARAY. A P9T resin proves particularly effective as a permeation barrier layer, in particular against alcohol fuels and peroxides tending to form in the fuel tank and in the fuel line, especially during the periods of parking of the motor vehicle. Particularly, a nylon P9T polyamide resin also ensures excellent properties of resistance to diesel fuel additivated with biodiesel (e.g. B30, B100, RME, SME, F.A.M.E., which are very harsh towards rubbers and plastic materials in general). Further, a nylon 9T polyamide resin has interesting adhesion properties, which allow to easily couple a layer of nylon 9T with another layer of a different polymeric material without needing to resort to an intermediate adhesive layer.

Preferably, the second intermediate layer 3 is made of a PA6, more preferably of a plasticized and impact modified PA6, even more preferably of PA6 1024 JI by UBE®.

For example, a polyamide 6 may be used having a melting point comprised between 210 and 230° C., a tensile strength at yield comprised between 25 and 35 MPa, a tensile elongation at break greater than 150% and an Izod impact strength (notched; 23° C.) between 100 and 200 J/m. In particular, a polyamide 6 is used which has improved properties of elongation at break, not only in the extrusion direction, but also in the cross-wise direction, thus advantageously improving the diametral elastic deformation properties thereof. In use, in fact, the ends of tube sections are bound to undergo diametral elastic deformations in view of certain applications (e.g. if used with quick-connect fittings, in the case of cold fitting over connections, etc.) Under such conditions, if the structure is not sufficiently elastic, the occurrence of breakages is very likely.

Preferably, the third intermediate tie layer is made of a co-polyamide, more preferably of a PA6/PA12 co-polyamide, even more preferably of PA6/PA12 7034 by UBE®. For example, a PA6/PA12 co-polyamide may be used having a melting point comprised between 190 and 210° C., a tensile strength comprised between 90 and 110 MPa, and a tensile modulus comprised between 550 and 750 MPa.

Unlike more commonly used adhesives, e.g. polyethylene- or polypropylene-based adhesives, a co-polyamide-base tie layer exhibits advantageous properties of resistance to high temperatures, and in particular to temperature peaks during use. Further, the use of such a co-polyamide-base tie layer proves advantageous during the stages of pre-moulding of the tube, which are generally carried out at relatively high temperatures (above 100° C.). The properties of other materials with a more limited resistance to high temperatures could, as a matter of fact, be negatively affected by the exposure to such high temperatures during the tube manufacture itself.

Preferably, the fourth external layer is of a PA12, more preferably an impact- and thermal-resistance-modified, plasticized PA12, even more preferably is PA12 3030 JI26L by UBE®.

For example an impact-modified, plasticized PA12 may be used, having a melting point comprised between 170 and 180° C., a tensile strength at yield comprised between 25 and 35 MPa, flexural strength (ISO 178) comprised between 20 and 30 MPa, flexural modulus (ISO 178) comprised between 400 and 600 MPa, an impact strength (Charpy, notched, ISO 179/1eA) comprised between 100 and 120 kJ/m² at 23° C. and between 10 and 20 kJ/m² at −40° C.

Commonly, the elastomeric and/or plasto-elastomeric materials used in fuel-line tubes have limited thermal resistance, therefore they need to be co-extruded with an external layer of a protective material, such as Sunprene®. On the contrary, employing such a polyamide 12 allows for the direct use within the engine compartment for operating temperatures up to approximately 150° C., without the need for a further external protective layer.

Alternatively, according to another preferred embodiment of the present invention, provided is a tube consisting of an innermost layer of nylon 9T, an intermediate layer of PA6, a tie layer of a copolyamide (CoPA), an intermediate layer of PA12, and an external protective layer of a material consisting of a mixture of a polyamide and a functionalized polyolefin, wherein the polyamide is the matrix and which comprises nanofillers. For example, such a material can be used having a melting point comprised between 200 and 220° C., a flexibility (ISO 686 standard) comprised between 25 and 50 Shore D and demonstrating creep resistance (ISO 899 standard) up to approximately 200° C. Preferably, a material of the X-LP series by Arkema® may be used.

The use of such a further external layer results in a further improvement of thermal resistance (up to 180° C.) and provides the multi-layer structure with flexibility and improved resistance to abrasion (which is useful, for example, against the effect of rubbing within the engine compartment, etc.)

A tube according to the present invention can solve the drawbacks coming with the tubes manufactured according to the prior art.

In particular, the structure of multi-layer tube 1 according to the present invention is suitable for use under conditions requiring a high resistance to gasoline, including gasoline containing different percentages of alcohols, and/ore resistance to diesel fuel and biodiesel of RME, SME, F.A.M.E. type.

Further, the structure of the multi-layer tube 1 according to the present invention shows high resistance to hydrocarbon peroxides (e.g. Perox 90).

Permeability measurements have also shown that the structure of the multi-layer tube 1 according to the present invention ensures low fuel permeation, in particular values of fuel permeation that are lower, or at least comparable with, those attained with the permeation barrier materials commercially available.

The structure of the multi-layer tube 1 according the present inventions further ensures a very wide operating temperature range, in particular an operating temperature range −50° C.÷140° C., with peaks at −60° C. and 150° C. With the multi-layer structures commercially available, operating temperature are normally in the range −30° C. (−40° C.)÷120° C., with peaks of approximately 125° C. (130° C.).

The multilayer tube 1 according to the present inventions shows pronounced properties of impact resistance, also at low temperatures. In particular, cold impact resistance even at temperatures of about −60° C. makes the multi-layer tube according to the present invention particularly suitable for the use under climatic conditions characterized by very harsh winters, such as those typical of Russia (e.g. Siberia), of Arctic Countries, etc.

Further improvements with respect to multi-layer structures commercially available have been found in the multi-layer structure 1 according to the present invention, in terms of elongation at tear, both in the extrusion direction and in the cross-wise direction. Also improved has proved the workability by elastic deformation of the ends of a section of multi-layer tube according the present invention, which turns out to be crucial in the stage of assembling fittings and connections, etc.

Further, while entailing an improvement in performances, the multi-layer structure according to the present invention makes use of a smaller amount of nylon 9T with respect to a known nylon 9T/PA 12 bi-layer structure, which results into a significant reduction of production costs.

Employing a co-polyamide-base tie layer further ensures properties of resistance to high temperatures, which is particularly advantageous during the pre-moulding of the tube.

Finally, modifications can be made to the multi-layer tube described above, in particular as concerns the layer thickness, without departing from the scope of the present invention. The invention will be described by means of an example, but it is not however limited to it.

EXAMPLE 1

A tube according the present invention has the structure and composition shown in Table 1. Layers are numbered from the inside to the outside.

TABLE 1

| Layer | Material - Producer | Thickness (mm) |
|---|---|---|
| 1 | P9T Genestar - Kuraray | 0.15 |
| 2 | PA6 1024 JI - UBE | 0.25 |
| 3 | PA6/PA12 co-polyamide 7034 - UBE | 0.10 |
| 4 | PA12 3030 JI26L - UBE | 0.50 |

Comparative Examples 2A-2D

Tables 2A-2D show structure and composition of tubes with which the tube of Example 1 was compared. Layers are numbered from the inside to the outside.

TABLE 2A

| Layer | Material - Producer | Thickness (mm) |
|---|---|---|
| 1 | ETFE AH3000 - UBE | 0.25 |
| 2 | PA12 3030J16L - UBE | 0.75 |

TABLE 2B

| Layer | Material - Producer | Thickness (mm) |
|---|---|---|
| 1 | PVDF KYNAR 720 - ARKEMA | 0.10 |
| 2 | ADHEFLON ASP 720- ARKEMA | 0.05 |
| 3 | PA12 RILSAN AESN P202 T6L- ARKEMA | 0.85 |

TABLE 2C

| Layer | Material - Producer | Thickness (mm) |
|---|---|---|
| 1 | PA6 VESTAMID BS0701 - DEGUSSA | 0.45 |
| 2 | EVOH EVAL FP101 - DEGUSSA | 0.15 |
| 3 | PA12-based CoPA - DEGUSSA | 0.10 |
| 4 | PA6 VESTAMID LX9002 - DEGUSSA | 0.30 |

TABLE 2D two-layer

| Layer | Material - Producer | Thickness (mm) |
|---|---|---|
| 1 | P9T Genestar - Kuraray | 0.25 |
| 2 | PA12 3030 JI26L - UBE | 0.75 |

Permeability measurements were carried out according to a standard procedure based on which, by means of successive weighings, the progressive weight loss off a tube filled with a fuel under pressure (4 bar) and kept at 60° C. is evaluated. Since the test circuit is closed, the loss weight is ascribable solely to fuel permeating through the tube wall and its subsequent emission into the surrounding environment.

TABLE 3

| | Example 1 | Example 2A | Example 2B | Example 2C |
|---|---|---|---|---|
| $g/m^2/h$ L0003 FLUID | 3.51 | 4.11 | 4.21 | 5.83 |
| g/m/24 h L0003 FLUID | 1.59 | 1.86 | 1.90 | 2.64 |
| $g/m^2/h$ TF1 FLUID | 0.23 | 1.68 | 1.67 | 1.7 |
| g/m/24 h TF1 FLUID | 0.10 | 0.77 | 0.75 | 0.78 |

Table 3 shows results of permeability measurements carried out on the multi-layer structure of the present invention and on different known structures commercially available. Data referring to 500 h of tests carried out at a constant temperature of 60° C. are expressed both in terms of loss weight per surface unit per hour and in terms of loss weight per length unit over 24 hours.

Tests have been carried out by using as a test fluid respectively L0003 (a diesel fuel additivated with 15% vol. methanol and 100 ppm of formic acid), known for its pronounced tendency to permeation, and TF1 (a fuel consisting of 45% vol. toluene, 45% vol. iso-octane and balance 10% ethanol).

It will appear from the results that the tube according to the present invention shows the lowest permeation values under all conditions considered, with a significant reduction of permeability.

TABLE 4

| | Example 2C | Example 2B | Example 2A | Example 1 |
|---|---|---|---|---|
| CM 15 g/m | 98.0 | 82.1 | 30.6 | 5.3 |

Similarly, Table 4 shows the results of permeation tests carried out on the multi-layer structure of the present invention and on different known multilayer structures, using as the test fluid a lab fuel (CM 15), consisting of 85% vol. Haltermann CEC-RF-08-A-85 (non-alcohol premium unleaded gasoline, with 1.5% vol. maximum content of oxygenated compounds) and of balance 15% vol. methanol. Data referring to 500 h tests carried out at a constant temperature of 40° C. are expressed in terms of loss weight per length unit.

From the data of Table 4, it appears that the use of the multi-layer structure according to the present inventions is associated with the lowest permeation value.

TABLE 5

| | Example 2C | Example 2A | Example 2B | Example 1 |
|---|---|---|---|---|
| CE 10 g/m | 24.0 | 21.7 | 9.3 | 0.9 |

Table 5 similarly refers to permeability tests carried out on the multi-layer structure of the present inventions and on different known multilayer structures, using as the test fluid a standard gasoline (CE 10) (a gasoline containing 10% vol. ethanol). Data, referring to 500 h tests carried out at the constant temperature of 40° C., are expressed in terms of weight loss per tube length unit.

In addition to permeability tests, tubes aged for 500 h at 60° C. were subjected to mechanical tests so as to evaluate the effects of temperature on impact resistance and elongation at tear, both in the extrusion direction and in the cross-wise direction, as well as to burst tests.

Also, mechanical tests were performed on tubes that had undergone prolonged ageing at different temperatures. In particular, with the multi-layer structure according to the present invention (Example 1), surprisingly good results were achieved after ageing in alcohol gasoline for 3000 h at temperatures of approximately 130° C.

As regards impact resistance, tests were carried out after ageing in test fluids, at temperatures in the range −40÷−60° C.

Table 6 shows some results referring to cold impact resistance tests carried out after 4 hours at −40° C. on tubes manufactured according to Example 1 that had previously aged in test fluids.

TABLE 6

| Tube ageing prior to impact resistance test | Test result |
|---|---|
| After 5000 h at 60° C. in CE 10 | No cracks nor damages |
| After 1000 h at 60° C. in CM 15 | No cracks nor damages |
| After 1000 h at 60° C. in Perox 90 | No cracks nor damages |
| After 1000 h at 60° C. in L0003 | No cracks nor damages |
| After 200 h of immersion in $ZnCl_2$ | No cracks nor damages |

Impact resistance tests were carried out at low temperature (−60° C.) after an ageing cycle of 3000 h, with internal flow of FAN B fluid at 90° C. and pulsating pressure from 5.5 to 8 bar, external temperature of 110° C. No cracks or damages were detected in the tubes.

The multi-layer tube according to the present invention was subjected to burst tests according to the SAE J2260 standard. Table 7 shows the results of the tests carried out under different conditions and following different ageing processes.

TABLE 7

| Operating conditions | Burst pressure (bar) |
|---|---|
| Room temperature | 79 |
| At 115° C. | 37 |
| After kinking | 80 |
| After 5000 h at 60° C. in CE 10 | 98 |
| After 1000 h at 60° C. in CM 15 | 79 |
| After 1000 h at 40° C. in Perox 90 | 63 |

The multi-layer structure according to the present invention (Example 1) was subjected to elongation at tear tests. The test results of the are shown in Table 8.

TABLE 8

| Measurement | Example 1 - new | Example 1 - after 3000 h ageing | Example 2 D - new |
|---|---|---|---|
| Longitudinal yield stress | 38.2-40.1 N/mm$^2$ | 36.7-37.9 N/mm$^2$ | 32.4-34.6 N/mm$^2$ |
| Cross-wise yield stress | 40.7-41.9 N/mm$^2$ | 41.1-42.8 N/mm$^2$ | 34.8-37.4 N/mm$^2$ |
| Longitudinal elongation at tear | 210-260% | 210-226% | 175-185% |
| Cross-wise elongation at tear | 201-218% | 205-212% | 150-160% |

During longitudinal elongation at tear tests a remarkable improvement was reported with respect to a P9T/PA12 bi-layer structure (Example 2D). An even less expected and surprising result was achieved as regards cross-wise elongation at tear, for which a 150% improvement was recorded with respect to a P9T/PA12 bi-layer structure (Example 2D).

In particular, the increased elastic deformability in the cross-wise direction is advantageous in consideration of the use of quick-connect fittings for the assembly of tubes on a motor vehicle. With the multi-layer structure of the present invention, the occurrence of breakings at connection joints and fittings proved to be significantly reduced.

The invention claimed is:

1. A motor vehicle fuel conveying multi-layer tube comprising from the inside to the outside, at least:
   an innermost first layer comprising a polyamide resin (nylon 9T) consisting of a dicarboxylic acid component and a diamine component, wherein 60÷100% of the dicarboxylic component is terephthalic acid and 60÷100% of the diamine component is a diamine component selected from 1,9-nonanediamine and 2-methyl-1,8-octanediamine;
   an intermediate second layer of polyamide 6 (PA6) comprising an impact modified polyamide 6;
   a third layer consisting of a co-polyamide (CoPa)-based tie layer and an external fourth layer of polyamide 12 (PA12).

2. The motor vehicle fuel conveying multi-layer tube according to claim 1, wherein said polyamide 6 has a melting point comprised between 210 and 230° C., a tensile strength at yield comprised between 25 and 35 MPa, a tensile elongation at break greater than 150% and an Izod impact strength (notched; 23° C.) between 100 and 200 J/m.

3. The motor vehicle fuel conveying multi-layer tube according to claim 1, wherein said third layer is a tie layer consisting of a PA6/PA12 co-polyamide.

4. The motor vehicle fuel conveying multi-layer tube according to claim 3, wherein said PA6/PA12 co-polyamide has a inching point comprised between 190 and 210° C., a tensile strength comprised between 90 and 110 MPa, and a tensile modulus comprised between 550 and 750 MPa.

5. The motor vehicle fuel conveying multi-layer tube according to claim 1, wherein said fourth layer comprises an impact- and thermal-resistance-modified polyamide 12.

6. The motor vehicle fuel conveying multi-layer tube according to claim 1, wherein said polyamide 12 has a melting point comprised between 170 and 180° C., a tensile strength at yield comprised between 25 and 35 MPa, flexural strength comprised between 20 and 30 MPa, flexural modulus comprised between 400 and 600 MPa, an impact strength (Charpy, notched) comprised between 100 and 120 kJ/m$^2$ at 23° C. and between 10 and 20 kJ/m$^2$ at −40° C.

7. The motor vehicle fuel conveying multi-layer tube according to claim 1, wherein said first layer has a thickness in the range 0.10 mm÷0.25 mm.

8. The motor vehicle fuel conveying multi-layer tube according to claim 1, wherein said second layer has a thickness in the range 0.20 mm÷0.30 mm.

9. The motor vehicle fuel conveying multi-layer tube according to claim 1, wherein said third layer has a thickness in the range 0.10 mm÷0.30 mm.

10. The motor vehicle fuel conveying multi-layer tube according to claim 1, wherein said fourth layer has a thickness in the range 0.35 mm÷0.55 mm.

11. The motor vehicle fuel conveying multi-layer tube according to claim 1, wherein said first, second, third and fourth layer are co-extruded.

12. The motor vehicle fuel conveying multi-layer tube according to claim 1, wherein said multi-layer tube further comprises a fifth layer external to said fourth layer, said fifth layer being of a material consisting of a mixture of a polyamide and a functionalized polyolefin, wherein the polyamide of the mixture is a matrix of the mixture of a polyamide and a functionalized polyolefin, the mixture comprising nanofillers.

13. The motor vehicle fuel conveying multi-layer tube according to claim 12, wherein said material has a melting point comprised between 200 and 220° C. and a flexibility comprised between 25 and 50 Shore D, said material further demonstrating creep resistance up to approximately 200° C.

14. The motor vehicle fuel conveying multi-layer tube according to claim 13, wherein said first, second, third, fourth and fifth layer are co-extruded.

* * * * *